United States Patent [19]
Whitaker et al.

[11] 3,773,481
[45] Nov. 20, 1973

[54] A METHOD OF FORMING A SYMMETRICAL GRINDING WHEEL

[75] Inventors: Noble D. Whitaker, Los Alamitos; Thomas M. Akashi, Gardena; John A. Aurentz, Palos Verdes Peninsula, all of Calif.

[73] Assignee: Pacific Grinding Wheel Co., Inc., Marysville, Wash.

[22] Filed: Nov. 9, 1970

[21] Appl. No.: 87,710

[52] U.S. Cl. .................. 51/295, 51/298, 264/331
[51] Int. Cl. ............................................ B24d 3/30
[58] Field of Search .................. 51/295, 298, 309, 51/293; 264/331

[56] References Cited
UNITED STATES PATENTS

| | | | |
|---|---|---|---|
| 3,369,879 | 2/1968 | Miller | 51/293 |
| 3,615,302 | 10/1971 | Rowse | 51/309 |
| 3,573,013 | 3/1971 | Curn et al. | 51/309 |
| 2,943,926 | 7/1960 | Goepfert | 51/298 |
| 3,576,610 | 4/1971 | Mathewson | 51/295 |
| 3,208,836 | 9/1965 | Biglin et al. | 51/298 |
| 2,939,777 | 6/1960 | Gregor et al. | 51/298 |
| 3,273,984 | 9/1966 | Nelson | 51/298 |

*Primary Examiner*—Donald J. Arnold
*Attorney*—White, Haefliger and Bachand

[57] ABSTRACT

An abrasive grinding wheel is formed by compression of a mix including abrasive and resin particles, and includes the steps:

a. filling the mix into an annular recess formed by a sleeve, a stripper platen received axially into the sleeve, and a central stem projecting axially within the sleeve; and b. advancing a plunger relatively toward the platen to compress the mix in the recess and to an extent that the mix frictionally engages the sleeve inner wall, the sleeve being displaced axially and relatively toward the platen during the mix compression and to an extent causing generally equalized compression packing of the mix at axially opposite side regions of the mix.

2 Claims, 4 Drawing Figures

INVENTORS.
NOBLE D. WHITAKER
THOMAS M. AKASHI
JOHN A. AURENTZ

By
White, Haefliger & Bachand
ATTORNEYS.

INVENTORS.
NOBLE D. WHITAKER
THOMAS M. AKASHI
JOHN A. AURENTZ
BY
White, Haefliger & Bachand
ATTORNEYS.

A METHOD OF FORMING A SYMMETRICAL GRINDING WHEEL

BACKGROUND OF THE INVENTION

This invention relates generally to the forming of abrasive grinding wheels, and more particularly concerns apparatus for molding a mix containing abrasive and resin particles to produce such wheels.

In producing resin bonded grinding wheels, it is usual to mold the abrasive, and resin particles into final shape by applying pressure and, thereafter, curing the resin outside the mold. This procedure makes it almost impossible to obtain a wheel having accurate dimensions, the long cure cycle after molding frequently causing warping. In co-pending U. S. Pat. application Ser. No. 880,949 now U.S. Pat. No. 3,661,544 there is disclosed a method of molding abrasive and resin particles to enable curing of the resin in the mold, enabling rapid production of grinding wheels of high quality; however, molding apparatus to enable formation of a wheel characterized by symmetrical abrasive particle density or packing at opposite sides of the wheel was not disclosed. The provision of such qualities in a grinding wheel cured in the mold is greatly desired, since such a wheel abrades at the same rate at its opposite side regions, in use.

SUMMARY OF THE INVENTION

It is a major object of the invention to provide apparatus and method for overcoming the above problems and to enable rapid formation of a resin bonded grinding wheel of high quality having particle density or compaction characteristics which are the same at opposite side regions of the wheel, ie are symmetrical with respect to a plane normal to the wheel axis and bisecting the wheel material.

Basically, the molding apparatus comprises a mold sleeve defining a central axis; a mold platen received axially into the sleeve, the sleeve mounted for axial displacement relative to the platen; a central stem projecting axially within the sleeve so that the sleeve, platen and stem form an annular recess to receive the mix for compression; and an annular plunger movable axially in the sleeve relatively toward the platen and relative to the sleeve, thereby to compress the mix causing it to frictionally displace the sleeve axially relatively toward the platen to an extent such that the platen and plunger effect symmetrical compression of the mix at opposite sides of a plane normal to the axis and bisecting the compressed mix. Typically, the stem may be mounted for axial displacement relative to the platen, and the compression of the mix causes it to frictionally displace the stem axially relatively toward the platen, to enhance the symmetrical compression as referred to. Accordingly, the resultant wheel will grind and abrade at the same rate at opposite side regions thereof.

Additional objects and advantages of the invention includes the provision of a compression spring or springs located to yieldably resist sleeve axial displacement relatively toward the platen, and also to resist stem displacement as described; means to heat the platen and plunger for rapid heat transfer into the mix during compression in the mold; means to introduce the mix into the recess with the plunger in retracted position; and means rotatable within the mix receiving recess to substantially uniformly distribute the granular mix thereon at times when the plunger is retracted.

In its method aspects, the basic steps of the invention include filling the mix into the recess formed by the sleeve, platen and control stem; advancing the plunger relatively toward the platen to compress the mix in the recess and to an extent that the mix frictionally engages the sleeve inner wall or bore; and effecting sleeve displacement axially and relatively toward the platen during the mix compression and to an extent causing generally equalized compression packing or densification of the molded wheel at opposite side regions thereof, and during curing in the mold.

These and other objects and advantages of the invention, as well as the details of an illustrative embodiment, will be more fully understood from the following description and drawings, in which:

DRAWING DESCRIPTION

DETAILED DESCRIPTION

Figure 4:
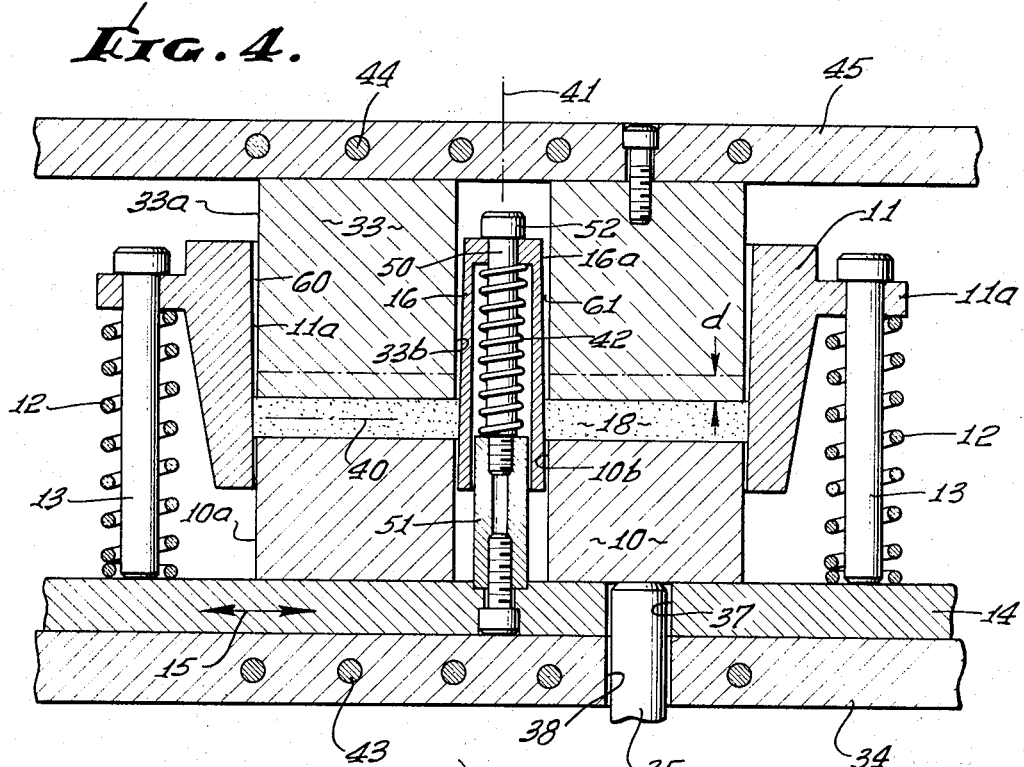
FIG. 4 is a side elevation taken in section to show molding of a mix filled into and spread in a mold.

In the drawings, a cylindrical mold platen or stripper plate 10 is partially received upwardly into a mold sleeve 11 which is mounted for axial displacement relative to the platen. Such mounting may with unusual advantage include a series of compression springs 12 extending about guide pins 13 spaced about the sleeve, so that the spring upper terminals support a sleeve flange 11a. The lower terminals of the springs rest on a slide plate 14 which is movable laterally in the direction of arrows 15. That plate also supports the platen 10.

A central stem 16 projects axially within the sleeve so that the sleeve, platen 10 and stem 16 form an annular recess 17 to receive the mix generally indicated at 18. In general, the mix may be formed by mixing an abrasive composition containing abrasive particles and preferably, friable particles, with a liquid, multi-stage, thermosetting resin and coating substantially all of the individual particles with the resin; curing the resin to the B-stage while the resin is in contact with the particles to form a fusible solid coating on the particles and forming individual particles coated with the B-stage resin. Such mix formation is described in detail in co-pending application of Noble D. Whitaker, Ser. No. 880,949, filed Nov. 28, 1969 now U.S. Pat. No. 3,661,544.

Figure 1:
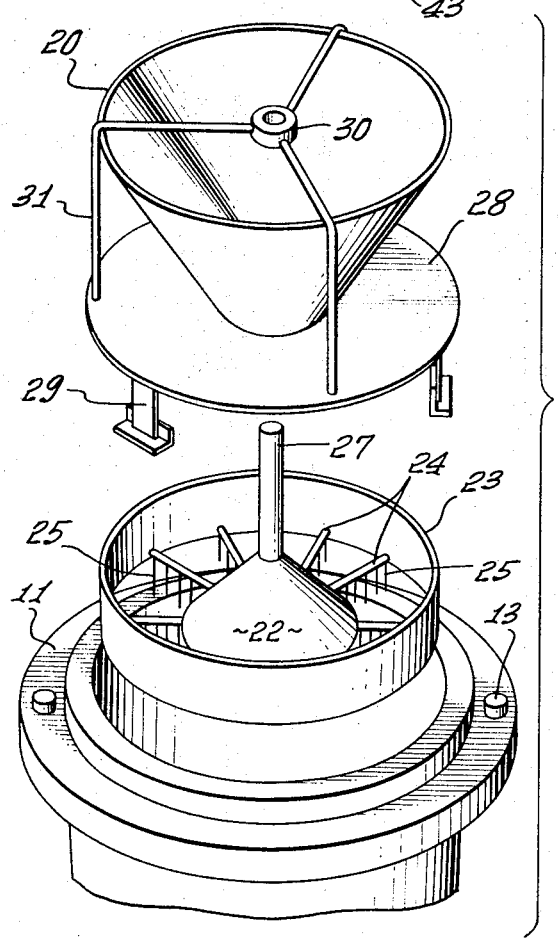
FIG. 1 is an exploded perspective showing of filling apparatus.
Figure 3:
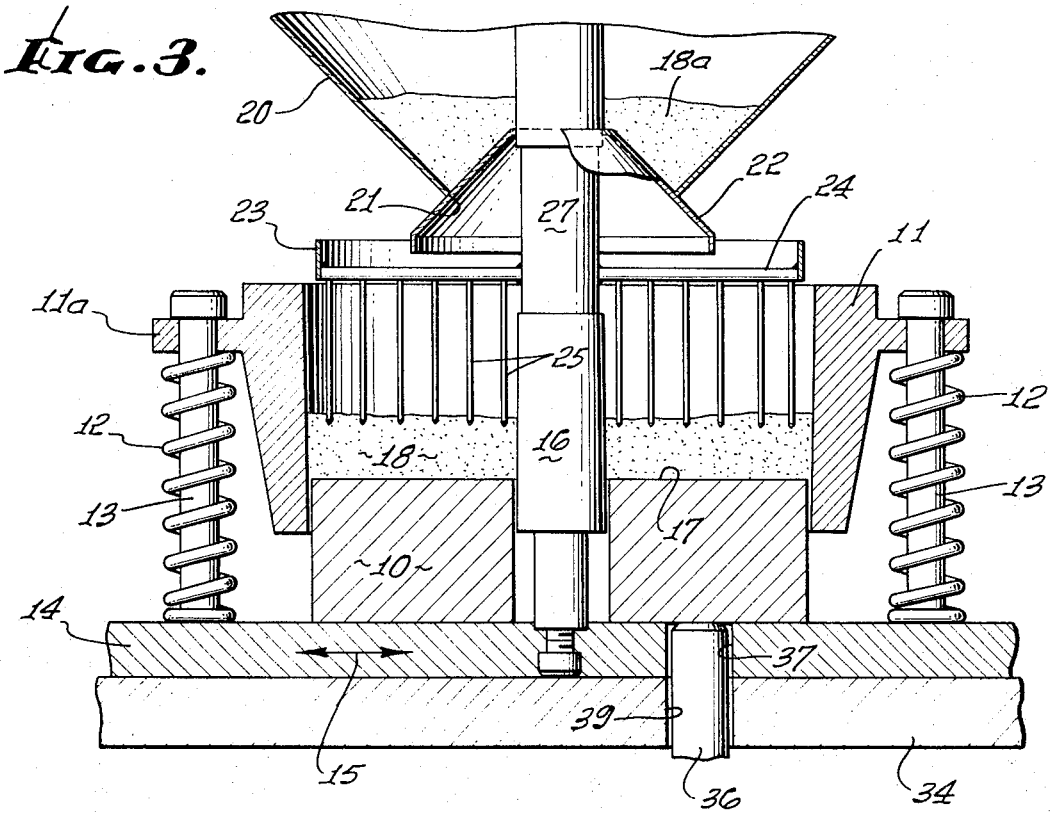
FIG. 3 is a side elevation taken in section to show the FIG. 1 apparatus functioning as a spreader.
Figure 2:
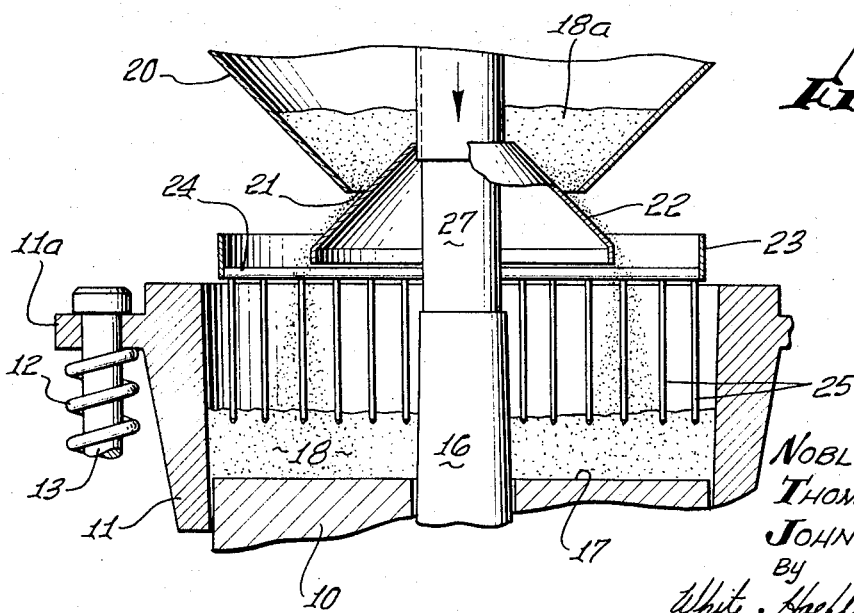
FIG. 2 is a side elevation taken in section to show the FIG. 1 apparatus during a mold filling operation.

Referring now to FIGS. 1–3, means is there shown to introduce the mix 18 into the recess 17, and to uniformly distribute the mix therein, at times when a mold plunger, to be described, is retracted from the recess. Such means may advantageously include a conical hopper 20 containing mix particles 18a and having a bottom opening 21; and a spreader cone 22 having an up-position as seen in FIG. 3 in which it closes the opening 21, and a down-position as seen in FIG. 2 in which it allows mix particles to gravitate through the opening 21 and onto the spreader cone for lateral spreading and free fall into the recess 17.

A ring 23 is concentrically connected with the spreader cone 22 as by spider arms 24 which extend radially and with spacing therebetween to pass the mix particles, the ring preventing lateral escape of falling particles. Pins 25 freely hang or dangle from the arms 24 and depend into the mix 18. Upon manual rotation of the ring, as facilitated by vertical axle 27 centrally connected with the spreader and seated on the stem 16, the lower tips of the pins drag through the mix and distribute it evenly in the recess 17 in preparation for subsequent molding.

Note in FIG. 1 the support stand 28 for the hopper funnel 20, with legs 29 adapted to seat on sleeve 11, at which time the axle 27 projects upwardly through the funnel and into bearing 30 carried by arms 31 attached to the stand 28 as shown.

When filling of mix into recess 17 is complete, the hopper 20, stand 28, spreader 22, ring 23, and pins 25 are lifted away from the sleeve 11, leaving it openly exposed. Next the slide plate 14 is shifted laterally and sufficiently to bring the recess 17 and mix 18 directly under a plunger 33 at a molding station. For this purpose the slide plate may be supported on a fixed base plate 34. Pins 35 and 36 project in openings 38 and 39 in the base plate, and in common opening 37 in the slide plate, to locate the latter in filling and molding position as seen in FIGS. 3 and 4, respectively.

In accordance with an important aspect of the invention, the plunger 33 is formed as an annulus, and movable vertically downwardly and axially in the sleeve 11 relatively toward the stripper platen and to the sleeve, thereby to compress the mix 18. The operation is such as to cause the mix to transmit force radially outwardly, to frictionally displace the sleeve axially relatively toward the platen, i.e., downwardly, whereby the platen and plunger effect symmetrical compression of the mix at opposite sides of a plane 40 normal to central axis 41 and bisecting the mix. In effect, the mix is treated as though plungers were displaced thereinto from opposite sides; however, only one plunger is needed, saving in cost of the equipment.

Note in this regard that this treatment is further effected through mounting of the stem 16 for axial displacement relative to the platen, the radially inward compression of the mix causing it to frictionally displace the stem downwardly along with the sleeve. Platen 10 remains fixed, at all times.

Springs 12 yieldably resist downward displacement of the sleeve, and a central spring 42 likewise yieldably resists downward displacement of the stem. The top of the mix is compressed toward the platen by the distance $d$ during such molding action. In addition, heat is transferred into the mix from the platen and plunger by conduction from heaters 43 in base plate 34, and heaters 44 in top plate 45 supporting the plunger 33. Heat and pressure applied to the mix forms a coherent mass of particles which is cured from B-stage in a few minutes. Pressures may be between 800 and 1,200 psi, and temperatures of the compressed mix between 300° and 350° F, the cure being complete in less than 5 minutes. The resultant product comprises a grinding wheel of excellent quality.

Finally, the plunger 33 may be withdrawn to provide access to the finished product, for removal from the mold, and the slide plate returned to FIG. 2–3 position. In this regard, the sleeve 16 and pins 13 can be lifted off the slide plate to facilitate wheel removal.

Stem 16 is guided for vertical movement by a central pin 50 attached at 51 to the slide plate. A head 52 on the pin limits upward displacement of the stem as urged by the spring 42.

EXAMPLE

A pre-mix is made as follows:

One hundred grams of epoxy resin (Epon 828), 20 grams of a modified amine as curing agent (Epon curing agent Z), and 75 grams of acetone as a diluent to lower the viscosity of the epoxy resin are mixed together at room temperature and, thereafter, there is added thereto a mixture composed of 1,000 grams of 46 grit $Al_2O_3$, 15 grams of expanded perlite O mesh and 2 grams of chrome yellow pigment.

As is known in the art, Epon 828 is a diglycidyl ether of bisphenol A and is a liquid at room temperature having a viscosity at 25°C. of between 100 and 150 poises, and epoxy equivalent of 175 to 210, a specific gravity at 20°C. of 1.167, and an equivalent weight of 85. Epon curing agent Z is a liquid aromatic amine which when used with epoxy resins yields crosslinked polymers. Curing agent Z has a viscosity of about 2,000 centipoises at 25°C.

The thus formed mixture of epoxy resin, curing agent and abrasive is blended thoroughly and spread on baking trays approximately one-half inch thick, and placed in an air circulating oven at 180° to 200°F. for 45 to 60 minutes. During this period the mixture may be periodically agitated to prevent caking.

After 60 minutes the material is removed from the oven and allowed to cool to room temperature. When the material is first removed from the oven the individual particles of abrasive ($Al_2O_3$), the perlite (for porosity) and the pigment are all coated with a tacky and soft coating. As the material cools the coating becomes very dry and brittle. During the cooling period the particles are agitated or "fluffed" in order to prevent caking. If desired the resultant individual particles or powder can be screened to remove agglomerates created during the processing or can be milled or ground to produce a relatively uniform particle size. Care should be taken during grinding not to remove or abrade the resing coating.

The thus formed coated abrasive particles and perlite can be stored for many months prior to molding the particles into an abrasive tool.

When it is desired to make a grinding wheel, the pre-mix, made as indicated above, is placed into a mold as described. In the present example, the pre-mix was placed in a 6 inch mold preheated to 325°F. The mix is then compressed at 1,000 psi as described and maintained at this temperature and pressure for 5 minutes. The wheel was then removed from the mold, cooled to room temperature and immediately placed on a surface grinder. The wheel removed 60 grams of tool steel ($R_c$ 42–46) with a wheel weight loss of 2 grams. No coolant was used. The metal grinding chips removed were of classical spiral "machined chip" configuration indicating ideal sharpness.

Referring back to FIG. 4, it will be noted that there is slight downwardly tapered annular clearance at 60 between the bore 11a and the sleeve or case 11 and the outer annular surfaces 10a and 33a of the stripper platen and plunger 33. For this purpose, surfaces 10a and 33a may be cylindrical about axis 41, and bore 11a may have vertical taper, as shown. For best results, the taper angularity at 60 should be between 4 and 35 minutes (which, in the event surface 11a is tapered, as described, is between 0.001 and 0.010 inches per inch taper):

Also, there is slight downwardly tapered annular clearance at 61 between the outer surface 16a of the stem 16 and the bores 33b and 10b of the plunger 33 and stripper platen 10 respectively. For this purpose, those bores may be cylindrical about axis 41, and the annular stem surface 16a may taper upwardly, as shown. Again, for best results as referred to above, the taper angularity at 61 should lie between 2 and 17.5 minutes (which, in the event surface 16a is tapered, as described, is between 0.00058 and 0.005 inches in a radial direction per inch of length in the axial direction.) Any further reduction in taper angularity below the lower limits referred to will result in excessive steel mold wear, excessive ejection pressure required to free the molded product, and excessive abrasion of that product during ejection. Any further increase in taper angularity above the upper limits referred to will result in formation of excessive flash at the periphery of the product wheel and loss of dimensional integrity.

I claim:

1. In the method of forming an abrasive grinding wheel from an abrasive mix composition consisting of abrasive particles coated with thermosetting resin cured to B-stage, said method involving the use of a mold sleeve defining an axis, a mold platen received axially into the sleeve, the sleeve mounted for axial displacement relative to the platen, a central stem projecting axially within the sleeve so that the sleeve, platen and stem form an annular recess, and a plunger movable axially in the sleeve relatively toward the platen and relative to the sleeve, the steps including:
   a. filling the mix into said recess,
   b. advancing the plunger within and relative to the sleeve, relative to the stem and relatively toward the platen to compress the mix in the recess and to an extent that the mix frictionally engages the sleeve inner wall and stem outer wall, and
   c. effecting sleeve and stem displacement axially and relatively toward the platen during said compression of the mix and in response to force transmission from the mix to the sleeve and stem via the mix inner and outer annular peripheries and to an extent causing generally equalized compression packing of the mix at axially opposite side regions of the mix, and yieldably resisting said sleeve and stem displacement.

2. The method of claim 1 including transferring heat into the compressed mix, and continuing said heat transfer and compression to effect curing of the resin in said recess.

* * * * *